3,785,927

PROCESS FOR CONVERTING (—)RETICULINE TO (+)SALUTARIDINE

Erwin F. Schoenewaldt, Watchung, and Ernel D. Ihnen, Warren Township, N.J., assignors to Merck & Co., Inc., Rahway, N.J.
No Drawing. Filed Feb. 12, 1973, Ser. No. 331,394
Int. Cl. C12d 1/00
U.S. Cl. 195—51 R                   21 Claims

ABSTRACT OF THE DISCLOSURE (+)salutaridine is produced by reacting (—)reticuline with an oxidative phenolic coupling enzyme produced by growing a suitable strain of Schizomycetes or Eumycetes in an aqueous nutrient medium.

BACKGROUND OF THE INVENTION

A method for the phenolic oxidation of (—)reticuline to (+)salutaridine has been sought for many years since the latter product can be converted to the alkaloid thebaine. It has been reported that reticuline can be oxidized with manganese dioxide to produce salutaridine in a yield of 0.024%. This yield of salutaridine is so low that it is clearly not of practical interest for manufacture. Accordingly, other methods of effecting this conversion have been sought.

SUMMARY OF THE INVENTION

It is an object of this invention to provide a new biochemical method for converting (—)reticuline to (+)salutaridine. It is a further object of this invention to provide an enzymatic process for this conversion which provides good yields of the desired product. Another object is to provide microorganisms capable of producing oxidative coupling enzymes. Other objects will be apparent from the description of this invention hereinafter provided.

In accordance with the present invention, it is now found that (—)reticuline can be converted to (+)salutaridine by reaction with an oxidative phenolic coupling enzyme produced by various strains of microorganisms belonging to the Schizomycetes or Eumycetes classes. This phenolic oxidation can be shown chemically as follows:

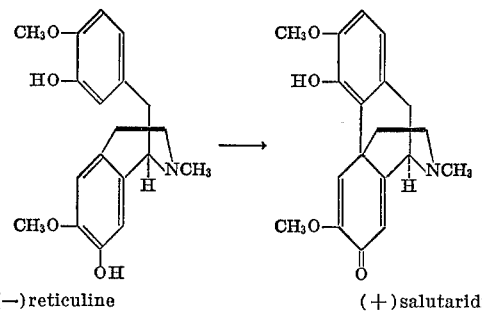

(—)reticuline → (+)salutaridine

In accordance with a preferred embodiment of this invention, it is now found that (—)reticuline is converted to (+)salutaridine by intimately contacting the starting material with an oxidative phenolic coupling enzyme produced by growing strains of Schizomycetes or Eumyetes in aqueous nutrient mediums. This conversion is most conveniently effected by growing suitable strains of Schizomycetes or Eumycetes producing the desired enzymes in the presence of reticuline. Alternatively, as will be readily apparent to those skilled in this art, the conversion can be carried out using the enzymes produced by the microorganisms, for example by intimately contacting the (—)reticuline with resting cells of the microorganisms producing the desired enzymes.

In carrying out the preferred method of converting (—)reticuline to (+)salutaridine, the strains of Schizomycetes or Eumycetes are grown in aqueous nutrient mediums in the presence of (—)reticuline for sufficient time to effect the desired conversion. The time and conditions for carrying out this fermentation will vary depending upon the particular microorganism used. In general, it is found that the organism can best be grown under aerobic conditions in nutrient media which are most suitable for the growth of the microorganisms. The temperature for carrying out the fermentation will depend upon the particular microorganism, but usually temperatures between about 24° C. and 37° C. are satisfactory and the fermentation is conveniently effected at about 28° C. The concentration of the (—)reticuline in the fermentation broth is not critical, and we generally prefer to use an amount between about 10–50 mg./100 ml. of broth depending upon the particular microorganism being utilized. In carrying out the process, the (—)reticuline can be added aseptically to the sterilized medium in the form of an aqueous solution at a pH of about 4.5 to 6.7, and the incubated medium is then allowed to grow for sufficient time, usually about 3 to 10 days, until maximum amounts of the (+)salutaridine are produced. Alternatively, as will be readily apparent to those skilled in this art, the reticuline can be added to the fermentation broth after the fermentation has been underway for some time and the fermentation can then be continued until the formation of the salutaridine is complete. Also, as will be apparent to those skilled in the art, the reticuline can be intimately contacted with the oxidative phenolic coupling enzymes produced by the fermentation of the selected microorganisms, for example by intimately contacting the (—)reticuline with resting cells of the strain which contains the desired enzymes.

The aqueous fermentation mediums used in carrying out the preparation of the desired biochemical enzyme system are prepared by methods known in the art for growing such microorganisms, for example those used in the production of antibiotics. Such mediums will contain assimilable sources of carbon and nitrogen and inorganic salts including trace metals required for the proper metabolism of the microorganisms.

In general, carbohydrates such as sugars, for example dextrose, sucrose, maltose, lactose, dextrin and the like, and starches are suitable sources of assimilable carbon in the nutrient mediums. The exact quantity of the carbon source which is utilized in the medium will depend, in part, upon the other ingredients of the medium, but it is usually found that an amount of carbohydrate between about 0.1 and 6% by weight of the medium is satisfactory. These carbon sources can be used individually or several such carbon sources may be combined in the medium.

Various nitrogen sources such as casein hydrolysates, papaic digests of soybean meal, peanut meal, peanut oil meal, distiller's solubles, corn steep liquors, sodium nitrate, ammonium chloride, ammonium sulfate and the like are readily assimilated by the microorganisms.

The process of the present invention converts (—)-reticuline to (+) salutaridine. Generally, it is preferred to use (—)reticuline as the starting material, although mixtures of the (—) and (+) forms of reticuline, and in particular the racemic mixture, can be used equally well in our process. The use of (—)reticuline in the process is preferred since maximum amounts of the desired (+)-salutaridine are obtained in this way and the recovery of the desired product is less complicated.

The (+)salutaridine produced by the process of this invention is readily recovered by extracting the alkaline filtered broth with a suitable water immiscible solvent such as ethyl acetate or benzene. The solvent solution of the desired product can then be purified further by chemical procedures such as further extraction, partition between alkaline aqueous solutions of the fermentation products and water immiscible solvents, and/or liquid chromatography or thin layer chromatography over silica and the like.

The (+)salutaridine produced by the process of this invention is conveniently assayed by liquid chromatography and/or thin layer chromatography using procedures which are hereinafter described. These assay methods provide a convenient means for determining the microorganisms producing the desired enzyme systems which effect the conversion of (−)reticuline to (+)-salutaridine. They may be therefore used for the screening of microorganisms which are suitable for use in the processes of this invention.

The oxidative phenolic coupling enzymes useful for the conversion of (−)reticuline to (+)salutaridine are produced by Schizomycetes and Eumycetes species of microorganisms. These classes of microorganisms are described in Bergey's Manual of Determinative Bacteriology, 7th ed., Williams and Wilkins, and in A Dictionary of the Fungi by Ainsworth and Bisby, 1954, Commonwealth Mycological Institute. Thus, we have found that species of the Pseudomonadeles and Actinomycetales orders of Schizomycetes, and in particular species of the genera Psenudomonas and Streptomyces produce enzymes suitable for converting (−)reticuline to (+)salutaridine. Thus, soil isolate strains Pseudomonas sp. MB 3119, Streptomyces sp. MA 4382, 4383, 4384, and 4390, and *Streptomyces griseus* MA-8 have been found to be useful. (The MB and MA numbers are those assigned to these clutures in the culture collection of Merck & Co., Inc. at Rahway, N.J.) Cultures of these organisms have been irrevocably deposited in the culture collection of the Northern Regional Research Laboratories of the Department of Agriculture at Peoria, Ill., where they are freely available to anyone under the following NRRL numbers:

Pseudomonas sp. MB 3119—NRRL B 5686
Streptomyces sp. MA 4382—NRRL 5688
Streptomyces sp. MA 4383—NRRL 5689
Streptomyces sp. MA 4384—NRRL 5690
Streptomyces sp. MA 4390—NRRL 5691
*Streptomyces griseus* MA–8—NRRL 5687.

The morphological and cultural characteristics of these organisms are shown in the following tables:

PSEUDOMONAS SP. MB 3119

Morphology.—Rods, 0.4 x 1.2–1.7 microns, occurring singly and in pairs. Gram-negative. Motile.

Nutrient agar colonies (48 hrs.—28° C.).—Circular, edge entire, glistening, slightly raised, viscous, tan-colored, 2–3 mm.

Nutrient agar slant (48 hrs.—28° C.).—Growth good, filiform, glistening.

Nutrient broth (48 hrs.—28° C.).—Turbid, small button of sediment that is viscous on being disturbed, no ring or pellide.

EMB agar.—Growth good, pinkish-tan in color, semi-transparent.

Skim milk plate.—Growth good, moderate hydrolysis of casein.

Litmus milk.—Growth but no change in color or consistency.

Nitrate reduction.—Negative.
Oxidase.—Positive.
Catalase.—Positive.
Indole.—Negative.
$H_2S$ production.—Negative.
Methyl red.—Negative.
Voges-Proshauer.—Negative.
Gelating.—Moderate liquefaction.
Starch.—No hydrolysis.
Aerobic.

Grows well at 28° C. and 37° C.

Slight acid production from dextrose under oxidative conditions after 5 days at 28° C.

STREPTOMYCES SP. MA 4382

Morphology.—Sporophores branched, flexuous, forming tufts. Spores oval, 0.9 x 1.2 microns (970×), in chains of more than 10 spores. Culture sporulated well on media.

Tomato paste-oatmeal agar.—V: Reverse—dark red. A: Powdery, flat, grayed dusty rose (6 ec). SP: Lt. reddish-brown.

Czapek Dox agar (sucrose nitrate agar).—V: Reverse—pink. A: Powdery, flat, pale grayish rose (5 cb). SP: Lt. rose.

Egg albumin agar.—V: Reverse—rose. A: Powdery, flat center—pale grayish rose (5 cb) edge with lt. beige (3 ec). SP: Lt. rose-beige.

Glycerol asparagine agar.—V. Reverse—dark red. A: Powdery, pale grayish rose (5 cb) edged with lt. beige (3 ec). SP: Rose-beige.

Inorganic salts-starch agar.—V: Reverse—grayish rose. A: Powdery, lt. being (3 ec) with rose tint in center of colony and greenish tint on edge. SP: Lt. rose beige.

Yeast extract-dextrose+salts agar.—V: Reverse—center reddish brown and edge dark tan. A: Powdery, lt. brown. SP: Lt. reddish-brown.

Yeast extract-malt extract agar.—V: Reverse—red. A: Powdery, pale grayish rose (5 cb) edged with lt. beige (3 ec). SP: Reddish-brown.

Peptone-iron-yeast extract agar.—V: Cream-colored to tan. A: Cream-colored. SP: None. Melanin: Negative. $H_2S$ production: Negative.

Nutrient agar.—V: Reverse—dark cream. A: Powdery, cream-colored. SP: None.

Nutrient starch argar.—V: Reverse—dark cream. A: Powdery, cream to lt. beige. SP: None. Hydrolysis of starch: Good.

Nutrient gelatin agar.—V: Reverse—pinkish cream. A: Powdery, flat, pale grayish-rose. SP: None. Liquefaction of gelatin: Good.

Gelatin stabs.—V: Slight, tan, flaky. A: None. SP: None. Liquefaction of gelatin: Complete.

Potato plug.—V: Tan. A: Good, lt. cream-colored to lt. beige. SP: Lt. browning of plug.

Loeffler's blood serum.—V: Cream-colored. A: None. SP: None. Liquefaction: None.

Skim milk agar.—V: Reverse—dark reddish-cream. A: Powdery, lt. cream. SP: Lt. reddish-brown. Hydrolysis of casein: Positive.

Litmus milk.—V: Good ring growth, tan with purplish cast. A: Moderate, white to beige. Color: Deep purple upper ½ and tan at bottom indicating reduction of litmus. Coagulation and/or peptonization: Almost complete peptonization, milk becoming alkaline—pH 8.0.

Skim milk.—V: Good ring growth, tan to brown. A: Moderate, beige. SP: Lt. brown. Coagulation and/or peptonization: Almost complete peptonization, milk becoming alkaline—pH 7.8.

Tyrosine agar.—V: Reverse—dark red. A: Powdery, flat, pale grayish rose (5 cb) edged with lt. beige (3 ec). SP: Rose. Decomposition of tyrosine: Positive.

Tryptone-yeast extract broth.—Purple pigment which becomes deep reddish-purple with NaOH (reversible on addition of acid) and tan-colored with HCl (reversible with addition of NaOH).

Carbon utilization.—Pridham-Gottlieb basal medium +1% carbon source; +=growth; ±=growth poor or questionable; −=no growth as compared to negative control (no carbon source): Glucose,+; arabinose, +; cellulose, −; fructose, +; inositol, −; lactose, +; maltose, ++; mannitol, +; mannose, ++; raffinose, −; rhamnose, −; sucrose, +; xylose, +.

Temperature range (yeast extract-dextrose+salts agar).—28° C.: Good growth. 37° C.: Moderate growth. 50° C.: No growth.

Oxygen requirement (stab culture in yeast extract-dextrose+salts agar).
Aerobic.
Nitrate reduction.—Positive.

STREPTOMYCES SP. MA 4383

Morphology.—Sporophores branched, flexuous, forming tufts. Spores oval to cylindrical, 0.9 x 1.2 microns (970×), in chains of more than 10 spores. Culture sporulated well on most media.

Tomato paste-oatmeal agar.—V: Reverse—brown. A: Grainy, lt. tan edged with greenish tan (2 ec). SP: None.

Czapek Dox agar (sucrose nitrate agar).—V: Colorless to lt. cream. A: Thin, flat, cream-colored. SP: None.

Egg albumin agar.—V: Reverse—tan. A: Thin, powdery, lt. beige. SP: None.

Glycerol asparagine agar.—V: Reverse—reddish tan. A: Grainy, lt. beige with yellow-green tones (2 db) edged with grayed yellow-green tones (2 db). SP: None.

Inorganic salts-starch agar.—V: Reverse—tan edged with greenish tan. A: Powdery to grainy, lt. tan with yellowish-green tones (2 ec). SP: Tan.

Yeast extract-dextrose+salts agar.—V: Reverse—brown, heavily wrinkled. A: Grainy, lt. tan with yellowish green tones (2 ec to 2 db). SP: Tan.

Yeast extract-malt extract agar.—V: Reverse—brown. A: Grainy, lt. tan with yellowish-green tones (2 db) edged with lt. tan. SP: Tan.

Peptone-iron-yeast extract agar.—V: Reverse—reddish tan. A: Powdery, cream to lt. beige. SP: None. Melanin: Negative. $H_2S$ production: Negative.

Nutrient agar.—V: Reverse—tan. A: Lt. beige. SP: None.

Nutrient starch agar.—V: Reverse—deep cream. A: Cream to lt. beige. SP: None. Hydrolysis of starch: Good.

Nutrient gelatin agar.—V: Reverse—tan. A: Cream-colored. SP: None. Liquefaction of gelatin: Good.

Gelatin stabs.—V: Moderate, lt. brown ring. A: None. SP: Lt. brown. Liquefaction of gelatin: Complete.

Potato plug.—V: Tan. A: Lt. cream-colored to lt. beige. SP: Slight browning of plug.

Loeffler's blood serum.—V: Tan. A: None. SP: None. Liquefaction: Slight.

Skim milk agar.—V: Tan. A: Cream to lt. beige. SP: None. Hydrolysis of casein: Positive.

Litmus milk—V: Good growth ring, tan with purplish cast. A: Moderate, white to beige. Color: Deep purple upper ½ and tan at bottom indicating reduction of litmus. Coagulation and/or peptonization: Almost complete peptonization, milk becoming alkaline—pH 8.05.

Skim milk.—V: Good growth, ring, tan to brown. A: Moderate, beige. SP: Lt. brown. Coagulation and/or peptonization: Almost complete peptonization, milk becoming alkaline—pH 7.85.

Tyrosine agar.—V: Reverse—brown. A: Grainy, grayish tan (3 ge). SP: None. Decomposition of tyrosine: Positive.

Carbon utilization.—Pridham-Gottlieb basal medium +1% carbon source; +=growth; ±=growth poor or questionable; —=no growth as compared to negative control (no carbon source): Glucose, +; arabinose, —; cellulose, —; fructose, +; inositol, —; lactose, +; maltose, +; mannitol, +; mannose, +; raffinose, —; rhamnose, —; sucrose, +; xylose, +.

Temperature range (yeast extract - dextrose+salts agar).—28° C.: Good growth. 37° C.: Moderate growth. 50° C.: No growth.

Oxygen requirement (stab culture in yeast extract-dextrose+salts agar).
Aerobic.
Nitrate reduction: Negative.

STREPTOMYCES SP. MA 4384

Morphology.—Sporophores branched, flexuous, forming tufts. Spores oval to cylindrical, 0.9 x 1.2 microns (970×) in chains of more than 10 spores. Culture sporulated well on most media.

Tomato paste-oatmeal agar.—V: Reverse—brown. A: Grainy, medium reddish-brown (4 ge). SP: Lt. brown.

Czapek Dox agar (sucrose nitrate agar).—V: Reverse—cream. A: Thin, grainy, cream with rose tint. SP: None.

Egg albumin agar.—V: Reverse—cream. A: Thin, powdery, cream with rose tint. SP: None.

Glycerol asparagine agar.—V: Reverse—dark brown. A: Granular, medium reddish-brown (4 ge). SP: Brown.

Inorganic salts-starch agar.—V: Reverse—rose beige. A: Granular, medium reddish brown (4 ge) edged with lt. beige (3 ec). SP: Reddish brown.

Yeast extract-dextrose+salts agar.—V: Reverse—reddish brown. A: Granular, lt. beige with reddish tones. SP: Reddish brown.

Yeast extract-malt extract agar.—V: Reverse—reddish brown. A: Grainy, medium reddish-brown (4 ge). SP: Reddish-brown.

Peptone-iron-yeast extract agar.—V: Reverse—brown. A: Beige. SP: Dark brown. Melanin: Positive. $H_2S$ production: Positive.

Nutrient agar.—V: Reverse—tan. A: Granular, lt. beige. SP: Lt. brown.

Nutrient starch agar.—V: Reverse—tan. A: Beige. SP: Lt. brown. Hydrolysis of starch: Good.

Nutrient gelatin agar.—V: Reverse—tan. A: Cream to beige. SP: Lt. brown. Liquefaction of gelatin: Good.

Gelatin stabs.—V: Growth good, tan. A: None. SP: Brown. Liquefaction of gelatin: Complete.

Potato plug.—V: Tan. A: Deep cream-colored. SP: Brown.

Loeffler's blood serum.—V: Cream-colored. A: None. SP: None. Liquefaction: None.

Skim milk agar.—V: Reverse—reddish-brown. A: Cream to beige. SP: Reddish-brown. Hydrolysis of casein: Positive.

Litmus milk.—V: Heavy ring and surface growth, dk. brown to gray with purplish cast. A: White to beige. Color: Brownish purple upper ½ and brown at bottom indicating reduction of litmus. Coagulation and/or peptonization: Peptonization almost complete, milk becoming alkaline, pH 8.2.

Skim milk.—V: Heavy ring growth, dark brown. A: Moderate, beige. SP: Dark brown. Coagulation and/or peptonization: Peptonization almost complete, milk becoming alkaline, pH 8.35.

Tyrosine agar.—V: Dark brown. A: Grainy, medium reddish-brown edged with lt. beige. SP: Dark brown. Decomposition of tyrosine: Positive.

Carbon utilization.—Pridham-Gottlieb basal medium +1% carbon source; +=growth; ±=growth poor or questionable; —=no growth as compared to negative control (no carbon source): Glucose, +; arabinose, ±; cellulose, —; fructose, +; inositol, ±; lactose, +; maltose, +; mannitol, +; mannose, +; raffinose, ±; rhamnose +; sucrose, +; xylose, +.

Temperature range (yeast extract-dextrose+salts agar).—28° C.: Good growth. 37° C.: Moderate growth. 50° C.: No growth.

Oxygen requirement (stab culture in yeast extract-dextrose+salts agar).
Aerobic.
Nitrate reduction: Positive.

STREPTOMYCES SP. MA 4390

Morphology.—Sporophores branched with chains of more than 10 spores forming tight spirals. Spores oval to cylindrical, 0.9 x 1.2 microns (970×). Sporulation good on most media.

Tomato paste-oatmeal agar.—V: Reverse—tan. A: Powdery, flat, medium brown with rose tones (4 ge). SP: none.

Czapek Dox agar (sucrose nitrate agar).—V: Reverse—lt. reddish-brown. A: Thin, powdery, medium reddish-brown (4 ge). SP: None.

Egg albumin agar.—V: Reverse—lt. brown. A: Thin, powdery, lt. brown to medium reddish-brown. SP: None.

Glycerol asparagine agar.—V: Reverse—lt. reddish-brown to tan. A: Powdery, medium reddish-brown (4 ge). SP: None.

Inorganic salts-starch agar.—V: Reverse—lt. reddish-brown. A: Thin, powdery, medium reddish-brown (4 ge). SP: None.

Yeast extract-dextrose+salts agar.—V: Reverse—reddish brown to tan. A: Powdery, medium reddish-brown (4 ge). SP: None.

Yeast extract-malt extract agar.—V: Reverse—reddish-brown to tan. A: Powdery, medium reddish brown (4 ge) edged with areas of dark reddish brown vegetative growth. SP: None.

Peptone-iron-yeast extract agar.—V: Tan. A: Sparse, beige. SP: None. Melanin: Negative. H$_2$S production: Negative.

Nutrient agar.—V: Reverse—deep rose-cream. A: Lt. rose-beige. SP: None.

Nutrient starch agar.—V: Reverse—rose-beige. A: Grayed lavender. SP: Lt. reddish-tan. Hydrolysis of starch: Good.

Nutrient gelatin agar.—V: Reverse—cream with rose tint. A: Rose-cream. SP: None. Liquefaction of gelatin: Good.

Gelatin stabs.—V: Tan ring growth. A: None. SP: Lt. brown. Liquefaction of gelatin: Complete.

Potato plug.—V: Tan. A: Brown. SP: Lt. brown.

Loeffler's blood serum.—V: Cream-colored. A: None. SP: None. Liquefaction: None.

Skim milk agar.—V: Reverse—dark rose. A: Powdery, medium reddish-brown edged with some grayish-brown areas. SP: Dark rose. Hydrolysis of casein: Positive.

Litmus milk.—V: Good ring growth, grayish-tan with purplish cast. A: None. Color: Purple upper ½ and pinkish-brown at bottom, indicating reduction of litmus. Coagulation and/or peptonization: Peptonization complete, milk becoming alkaline, pH 7.6.

Skim milk.—V: Good ring growth, tan to brown. A: None. SP: Pinkish beige. Coagulation and/or peptonization: Peptonization complete, milk becoming alkaline, pH 7.4.

Tyrosine agar.—V: Reverse—reddish-tan. A: Powdery, flat, medium reddish-brown (4 ge). SP: None. Decomposition of tyrosine: Positive.

Carbon utilization.—Pridham-Gottlieb basal medium +1% carbon source; +=growth; ±=growth poor or questionable; —=no growth as compared to negative control (no carbon source): Glucose, +; arabinose, +; cellulose, —; fructose, +; inositol, —; lactose, +; Maltose, +; mannitol, +; mannose, +; raffinose, +; rhamnose, —; sucrose, +; xylose, +.

Temperature range (yeast extract - dextrose+salts agar).—28° C.: Good growth. 37° C.; Moderate growth. 50° C.: No growth.

Oxygen requirement (stab culture in yeast extract-dextrose+salts agar)
Aerobic.

Nitrate reduction: Negative.

In the above descriptions of the Streptomyces organisms, V stands for vegetative growth, A for aerial mycelium and SP for soluble pigment. All the readings of the Streptomyces were taken after 3 weeks at 28° C. unless noted otherwise, and the pH of all media was adjusted to about 6.8–7.2. The color number designations were taken from the Color Harmony Manual, 1958, 4th ed. Container Corporation of America, Chicago, Ill.

Other microorganisms which have been found to be useful in the process of this invention are included in the Eumycetes class. In particular, the subclasses of Phycomycetes and Fungi imperfecti of the Eumycetes include species which are preferred for carrying out our invention. Thus, species of the genera Mucor, Syncephalastrum, Cunninghamella, S. Neurospora and Parasitella of the Mucorales and Sphoeriales subclasses and of the genera Penicillium, Aspergillus, Torula and Sterigmatocystis of the Fungi imperfecti represent preferred embodiments of our invention. Specific organisms of these genera and their identifying numbers in the Merck & Co., Inc. culture collection which are found to be particularly suitable are Penicillium chrystogenum MF 3965, Cunninghamella sp. MF 4547, Torula cremoris MY–59, Neurospora sp. MF 2347 and Aspergillus sp. MF 4536. In addition, other species of Eumycetes useful in the process of this invention are parasitella simplex ATCC 6476 (also known as Mucor parasiticus), Syncephalastrum nigricans QM 835, Cunninghamella echinulata QM 35L and Sterigmatocystis nigra NRRL 367. (ATCC refers to the American Type Culture Collection and QM refers to the Army Quartermaster Corp Collection at Natick, Mass.)

The following cultures have been irrevocably deposited in the culture collection of the Northern Regional Research laboratories of the Department of Agriculture at Peoria, Ill., where they are freely available to anyone under the following NRRL numbers:

Cunninghamella sp. MF 4547—NRRL 5695
Aspergillus sp. MF 4536—NRRL 5694
Torula cremoris MY–59—NRRL Y7495
Neurospora sp. MF 2347—NRRL 5692
Penicillium chrysogenum MF 3965—NRRL 5693.

The morphological and cultural characteristics of the first two organisms are shown in the following tables:

CUNNINGHAMELLA SP. 4547

Morphology.—Condiophores erect, branched, terminating in enlarged heads covered with spherical to oval conidia. Mycelium non-septate.

Colony description. — Czapek-Dox agar — cottony, spreading, lt. tan. Reverse yellow. Malt extract agar—floccose, spreading, lt. rose-beige. Reverse tan. Saboraud-dextrose agar—cottony, spreading, lt. rose-beige. Reverse, yellowish-tan.

ASPERGILLUS SP. MF 4536

Morphology. — Conidiophores short with chains of spherical conidia forming columnar heads.

Colony description.—Flat, spreading, dark olive green to dark sage green. Reverse of colony is yellow to yellowish-green. (Czapek-Dox agar, Saboraud dextrose agar and malt extract agar.)

EXAMPLE 1

One lyophilized tube of Parasitella simplex ATCC 6476 was suspended in 10 ml. of a sterile basal medium. 0.3 ml. of this suspension was used to inoculate each 10 ml. of sterilized basal medium containing 3000 µg. of dl-reticuline in 25 x 150 mm. test tubes. The resulting tubes were incubated at 28° C. for 5 days on a rotary shaker running at 220 r.p.m. and having a 2-inch displacement. The tubes were then removed from the shaker, and about 1 ml. of 0.5 M disodium phosphate adjusted to about pH 8 with NaH$_2$PO$_4$ was added followed by 2 ml. of ethyl acetate. The mixture was shaken vigorously until a smooth emulsion was obtained. The emulsion was transferred to a centrifuge tube and centrifuged for sufficient time to break the emulsion into solvent and aqueous fractions. The resulting ethyl acetate extract was then analyzed by liquid chromatography and thin layer chromatography in accordance with procedures hereinafter described and showed the presence of salutaridine.

The basal medium used in this example was prepared by dissolving 10 g. of dextrose, 3 g.of malt extract, 2 g. of yeast extract, and 8 g. of nutrient broth (Difco) in sufficient water to provide 1 liter of medium. Before use, the pH of the medium was adjusted to 7.0 by the addition of sodium hydroxide. When used as a solid or maintenance medium, 20 g./liter of agar was included. Sterilization was accomplished by autoclaving the mediums for 20 minutes at 121° C.

The dl-reticuline was added aseptically as a sterile aqueous solution to give a concentration of 300 μg./ml. This solution of dl-reticuline was prepared by dissolving 6 mg. in 1 ml. of water, adjusting the pH to 7 and sterilizing by filtration.

The ethyl acetate extract prepared as described above is assayed for the presence of salutaridine by liquid chromatography over an anion exchange resin and/or silica gel using the following procedures:

One-half ml. of the ethyl acetate extract prepared as described above is taken to dryness with a stream of nitrogen, and ½ ml. of an aqueous solution of sodium hydroxide adjusted to pH 11 is added to the residue. 10 microliters of this solution is injected into the anion exchange column, and the retention times of the peaks in the ensuing chromatogram are compared to the retention times of authentic (+)salutaridine. Typical retention times for isosalutaridine, (+)salutaridine and (−)reticuline using the anion exchange column are 4.2, 6.0 and 13.5 minutes, respectively. If a peak in the anion exchange chromatogram has an identical retention time with the authentic (+)salutaridine, then 10 microliters of the ethyl acetate extract is injected into a liquid chromatograph fitted with a silica gel column for additional confirmation. Typical retention times for (+)salutaridine and (−)reticuline using the silica gel column are 8.2 and 18.0 minutes, respectively. The following table shows the chromatographic conditions used in the anion exchange and silica gel liquid chromatographies:

| Type of chromatography | Anion exchange | Adsorption |
|---|---|---|
| Column | DuPont SAX (½ meter). | Nester/Faust SIL-X (1 meter). |
| Eluent | .01 M sodium borate (pH 9)/.001M. sodium nitrate. | 9/1 (v./v.) chloroform/methanol. |
| Column pressure, p.s.i.g. | 200 | 700 |
| Column flow rate, ml./min. | 0.4 | 0.6. |
| Temperature | Ambient | Ambient. |
| Detector (UV-254) | .01 OD | .01 OD. |
| Chart speed, in./min. | 0.2 | 0.2. |
| Injection size, microliters | 10 | 10. |

Fermentation broths giving positive results in the general screening by liquid chromatography are rechecked by two different systems of thin layer chromatography described below. For that purpose the remaining half of the ethyl acetate extract of the broth is separated and applied to the thin layer chromatography (TLC) plates in two spots on each of two TLC plates. One of these spots is an admixture with authentic (+)salutaridine which allows the observation of coincidence with the produced spot as a further evidence besides the Rf value. A pure authentic sample of (+)salutaridine (2 μg.) is also run alongside these two spots. The developed plates are visualized by UV absorption (fluoroescence quenching of the plates exposed to UV radiation) and color reaction caused by I₂ vapor. The latter method can enhance UV absorption. The limit of detection by either method is about 1 μg. in one spot which corresponds to 0.25% yield in the total broth.

TLC System A

Methanol/acetone/chloroform (1:1:8) on silica plates (silica gel, Quantum Industries).—In this system the following significant spots can be observed in order of decreasing mobility:

| Spot | Rf | UV absorption | I₂ reaction |
|---|---|---|---|
| Unknown I | 0.65 | Weak | Brown. |
| (+)salutaridine | 0.6 | Strong | Yellow. |
| Unknown II | 0.5 | Weak | Do. |
| Isosalutaridine | 0.45 | Strong | Do. |
| Isoboldine | 0.3 | Weak | Purple. |
| (−) Reticuline | 0.1 | Weak | Yellow. |

TLC System B

Chloroform on aluminum oxide F254 Type T (E. Merck).—Of the compounds mentioned above, only (+)salutaridine leaves the area of the origin (Rf 0.3) and on exposure to I₂ vapor it develops a characteristic gray color which soon turns yellow.

EXAMPLE 2

The suspension of *Parasitella simplex* ATCC 6476 prepared as described in Example 1 was used to inoculate via a sterile loop the surface of an agar slant containing the basal medium. The slants were incubated for 5 days at 28° C. at which time luxuriant growth was obvious. Several loopfuls of the fungus from the incubated slant were used to inoculate 40 ml. of sterile basal medium. 1 ml. of the resulting suspension was used to inoculate each of the thirty 250 ml. Erlenmeyer flasks containing 40 ml. of the sterile basal medium described in Example 1 plus 300 μg./ml. of dl-reticuline. The resulting inoculated flasks and control flasks without reticuline were incubated at 28° C. for 5 days on a rotary shaker. At this time the flasks containing the dl-reticuline were pooled and both the reticuline-containing fermentation broth and the control broth were assayed for salutaridine. The control broths were found not to contain salutaridine while the broths containing the dl-reticuline did contain salutaridine.

EXAMPLE 3

The slant culture of *Parasitella simplex* ATCC 6476 described in Example 2 was used to inoculate 40 ml. of basal medium in a 250 ml. Erlenmeyer flask and incubated for 2 days on a shaker at 28° C. 1 ml. of the resulting seed culture was used to inoculate each of 60 flasks containing 40 ml. of basal medium containing 300 μg./ml. of dl-reticuline. After incubation at 28° C. for 5 days on a shaker, the resulting fermentation broths were assayed and found to contain salutaridine.

EXAMPLE 4

One loopful of *Parasitella simplex* ATCC 6476 was transferred from a slant culture to 10 ml. of sterile basal medium. The resulting suspension (0.25 ml.) was used to inoculate 25 x 150 mm. test tubes containing 10 ml. of sterile basal medium and 300 μg./ml. of dl-reticuline. The inoculated tubes were incubated at 28° C. on a rotary shaker. Individual tubes were removed after 4, 5, 6, 7, 8, 9, and 10 days of incubation and assayed for the presence of salutaridine. The following table shows the amount of salutaridine contained in the fermentation broths when assayed by the procedures described herein.

| Days of incubation: | Salutaridine formed, μg./ml. |
|---|---|
| 4 | .5 |
| 5 | .9 |
| 6 | 3.6 |
| 7 | 1.4 |
| 8 | 3.5 |
| 9 | 2.9 |
| 10 | 5.7 |

EXAMPLE 5

A broth obtained by fermenting 2250 ml. basal medium containing 675 mg. of dl-reticuline as described in Example 3 was made alkaline to pH 8.1 by the addition of 14.2 g. of disodium phosphate. The resulting mixture was stirred with 500 ml. of ethyl acetate and filtered. The aqueous layer of the filtrate was extracted with two 350 ml. portions of ethyl acetate, and the resulting combined extracts were dried over sodium sulfate and concentrated in vacuo. The resulting residue was partitioned between 100 ml. of 4% sodium hydroxide solution and 100 ml. of benzene under nitrogen. The separated aqueous layer was washed with more benzene and then acidified to pH 7.0–8.0 with 85% phosphoric acid. The resulting alkaline solution under nitrogen atmosphere was extracted with 3× 100 ml. of chloroform, and the combined extracts were dried and concentrated. The residue was chromatographed on three silica plates (E. Merck, 2 mm., 20 x 20 cm.) using 20% methanol in chloroform as the developing solvent. On the developed plates two major bands were detected by UV and isolated by scraping. The silica scrapings were extracted with methanol, and the solid from the evaporation of the methanol was again extracted with dichloromethane which resulted in silica-free materials. The slower moving band (Rf 0.6, 13.0 mg.) was identified as isosalutaridine. The product of the faster moving band (Rf about 0.65) required further purification, which was accomplished on two alumina plates (20 x 20 cm., E. Merck) using chloroform as the solvent (Rf about 0.3). Isolation of the product from this band by the procedure described above affords 13.4 mg. of salutaridine enriched in the dextrorotatory isomer as a yellow crystalline solid. A crystallization from 0.2 ml. of ethyl acetate gave 7.1 mg. of pale yellow crystals. M.P. 212–214° C.; $[\alpha]_D$ +14.7±7.8 (c. 0.48, MeOH);

$\lambda_{max.}^{MeOH}$ 280 m$\mu$ ($\epsilon$=6,050), 241 m$\mu$ ($\epsilon$=18,900)

NMR (CDCl$_3$) $\tau$ 2.66 (C$_5$—H), 3.47 (AB quartet, C$_1$—H and C$_2$—H), 3.83 (C$_8$—H), 6.21 and 6.34 (OCH$_3$) and 7.61 p.p.m. (NCH$_3$), superimposable with authentic sample of (+)salutaridine.

Mass spec: M 327, m/e 312, 299, 284.

Isosalutaridine NMR (CDCl$_3$ $\tau$ 3.37 (C$_5$—H), 3.46 (C$_4$—H), 3.80 (C$_1$—H), 3.83 (C$_8$—H), 6.19 and 6.28 (OCH$_3$) and 7.59 p.p.m. (N—CH$_3$) all singlets.

EXAMPLE 6

One liter of sterilized basal medium containing dextrose, malt extract, yeast extract and nutrient broth (Difco) and 400 mg. of (—)reticuline.HCl·2H$_2$O [equivalent to 339 mg. of (—)reticuline base] was inoculated with *Parasitella simplex* ATCC 6476 and incubated with aeration for 6 days at 28° C. To the resulting fermentation broth was added 100 ml. of 0.5 M disodium phosphate and 250 ml. of benzene. After thorough agitation the mixture was filtered, the organic layer separated and the aqueous phase extracted with an additional 250 ml. of benzene. The combined benzene extracts were dried over sodium sulfate and extracted with two 50 ml. portions of 1 N sodium hydroxide in a nitrogen atmosphere. The combined alkaline extracts were backwashed with benzene, acidified to pH 7.5 with 85% phosphoric acid and extracted twice with 200 ml. of benzene. The combined benzene extracts were dried over sodium sulfate and concentrated to dryness in vacuo to obtain a residue of crude (+)salutaridine. This residue was chromatographed following the procedures described in Example 5 to yield a (+)salutaridine fraction affording crystals from ethyl acetate melting at 191–194° C. [melting point of authentic (+)salutaridine, 190–194° C.]. The optical rotary dispersion in ethanol was, in every detail, the same as that of an authentic sample of (+)salutaridine.

EXAMPLE 7

A large number of identical tubes containing sterilized basal medium and 300 $\mu$g. of (—)reticuline/ml. were inoculated with *Parasitella simplex* ATCC 6476 and incubated as described in Example 1. Beginning with 3 days after inoculation, duplicate tubes were removed, the pH determined, and the broth submitted for assay by the procedures described above. The results of these determinations are shown in the following table:

| Age (days) | Broth pH | Salutaridine, $\mu$g./ml. |
|---|---|---|
| 3 | 7.2 | 0.1 |
| 4 | 7.6 | 1.1 |
| 5 | 8.0 | 2.8 |
| 6 | 8.0 | 1.1 |
| 7 | 8.1 | 3.9 |
| 8 | 8.3 | 3.4 |
| 9 | 8.5 | 5.6 |
| 10 | 8.7 | 5.1 |
| 11 | 8.8 | 4.4 |
| 12 | 8.8 | 4.7 |

EXAMPLE 8

500 ml. of the standard basal medium described in Example 1 and containing 300 $\mu$g./ml. of dl-reticuline was placed in a 8" x 15" baking dish. The surface of this medium was inoculated by sprinkling with a spore suspension of *Parasitella simplex* ATCC 6476 and incubated at 28° C. for 5 days. At this time the dense heavy mat which had grown on the surface was removed from the original dish and transferred to one containing only 500 ml. of 0.1 M acetate buffer (pH 5.0). After floating one hour on the surface of the buffer with gentle rocking, the mat was again transferred to a dish containing the same buffer plus 0.1% dextrose and 300 $\mu$g./ml. of recticuline. This dish was then incubated at 28° C. for an additional 6 days. Assays were obtained on the original growth medium at 5 days and on the final resting cell medium after 6 days. The growth medium contained 1.3 $\mu$g./ml. of (+)salutaridine at transfer time, and the resting cell medium 2.13 $\mu$g./ml. after the additional 6 days. No additional growth was discernible in the resting cell phase.

EXAMPLE 9

Various sterilized mediums containing 300 $\mu$g./ml. of (—)reticuline shown in the table which follows were inoculated with *Parasitella simplex* ATCC 6476 and grown for 4 days and then assayed. The mediums and the (+)salutaridine assays are shown in the following table:

| Medium No. | Medium [1] | Salutaridine, $\mu$g./ml. |
|---|---|---|
| 1 | NYM plus 1 g. CaCO$_3$/flask | 3.2 |
| 2 | NYM plus 1 drop Tween 20/flask | 3.4 |
| 3 | 2% glucose plus 5% soybean meal | 2.4 |
| 4 | 2% glucose plus 5% soybean meal plus 0.3% YE | 2.2 |
| 5 | 2% glucose plus 5% CSL | 1.7 |
| 6 | 2% glucose plus 5% CSL plus 0.3% YE | 1.5 |
| 7 | 2% glucose plus 5% CSL plus 2% soybean meal | 1.8 |
| 8 | NYM (control) | 2.2 |

[1] All media (except that containing CaCO$_3$) were adjusted to pH 7.0; 40 ml. was charged to 250 ml. Erlenmeyer flasks in all cases.

NOTE.—NYM=standard nutrient broth-yeast extract-malt extract-glucose medium; YE=Yeast extract; CSL=Corn steep liquor.

EXAMPLE 10

The process of Example 1 was repeated using the following microorganisms in place of *Parasitella simplex* ATCC 6476:

Streptomyces sp. MA 4382
Streptomyces sp. MA 4383
Streptomyces sp. MA 4384
Streptomyces sp. MA 4390
*Streptomyces griseus* MA–8
*Penicillium chrysogenum* MF 3965
*Syncephalastrum nigricans* MF 2684
*Cunninghamella echinulata* MF 2757
*Torula cremoris* MY–59
Pseudomonas sp. MB 3119
Cunninghamella sp. MF 4547
Neurospora sp. MF 2347
Aspergillus sp. MF 4536
*Sterigmatocystis nigra* MF 523.

In each case the assay of the fermentation broth showed the presence of (+)salutaridine.

The (+)salutaridine produced in accordance with the above-described processes is converted to thebaine, a valuable alkaloid in accordance with methods known in the art.

We claim:

1. The process which comprises intimately contacting (—)reticuline with an oxidative phenolic coupling enzyme produced by growing a strain of the class consisting of Schizomycetes and Eumycetes in an aqueous nutrient medium to produce (+)salutaridine.

2. The process of claim 1 wherein the oxidative phenolic coupling enzyme producing strain is of the Schizomycetes class.

3. The process of claim 1 wherein the oxidative phenolic coupling enzyme producing strain is of the order Pseudomonadales or Actinomycetales.

4. The process of claim 3 wherein the oxidative phenolic coupling enzyme producing strain is of the genus Pseudomonas.

5. The process of claim 3 wherein the oxidative phenolic coupling enzyme producing strain is of the genus Streptomyces.

6. The process of claim 3 wherein the oxidative phenolic coupling enzyme producing strain is *Streptomyces griseus*.

7. The process of claim 3 wherein the oxidative phenolic coupling enzyme producing strain is Streptomyces sp. NRRL 5688.

8. The process of claim 1 wherein the oxidative phenolic coupling enzyme producing strain is of the subclass Phycomycetes or *Fungi imperfecti*.

9. The process of claim 8 wherein the oxidative phenolic coupling enzyme producing strain is of the order Mucorales or Sphoeriales.

10. The process of claim 8 wherein the oxidative phenolic coupling enzyme producing strain is selected from genera of the group Mucor, Syncephalastrum, Cunninghamella, S. Neurospora and Parasitella.

11. The process of claim 8 wherein the oxidative phenolic coupling enzyme producing strain is *Parasitella simplex* ATCC 6476.

12. The process of claim 8 wherein the oxidative phenolic coupling enzyme producing strain is Cunninghamella sp. NRRL 5695.

13. The process of claim 8 wherein the oxidative phenolic coupling enzyme producing strain is *Syncephalastrum nigricans* QM 835.

14. The process of claim 8 wherein the oxidative phenolic coupling enzyme producing strain is of the order Moniliales.

15. The process of claim 8 wherein the oxidative phenolic coupling enzyme producing strain is of the genera Penicillium, Aspergillus, Torula or Sterigmatocystis.

16. The process for producing (+)salutaridine which comprises growing an oxidative phenolic coupling enzyme producing strain of the class consisting of Schizomycetes and Eumycetes in an aqueous nutrient media in the presence of (—)reticuline.

17. The process of claim 16 wherein the strain is *Parasitella simplex* ATCC 6476.

18. The process of claim 16 wherein the strain is Cunninghamella sp. NRRL 5695.

19. The process for producing (+)salutaridine which comprises growing an oxidative phenolic coupling enzyme producing strain of the class consisting of Schizomycetes and Eumycetes in an aqueous nutrient media in the presence of (—)reticuline, and recovering said (+)salutaridine by extraction of the filtered alkaline fermentation broth with a water immiscible solvent.

20. The process of claim 19 wherein the strain is *Parasitella simplex* ATCC 6476.

21. The process of claim 19 wherein the strain is Cunninghamella sp. NRRL 5695.

References Cited
UNITED STATES PATENTS 3,622,457   11/1971   Dennis _____ 195—51 R ALVIN E. TANENHOLTZ, Primary Examiner